(12) United States Patent
Egashira et al.

(10) Patent No.: US 11,447,849 B2
(45) Date of Patent: Sep. 20, 2022

(54) NON-HEAT TREATED STEEL FOR INDUCTION HARDENING

(71) Applicant: Nippon Steel & Sumitomo Metal Corporation, Tokyo (JP)

(72) Inventors: Makoto Egashira, Tokyo (JP); Shigefumi Nishitani, Tokyo (JP)

(73) Assignee: Nippon Steel Corporation, Tokyo (JP)

(*) Notice: Subject to any disclaimer, the term of this patent is extended or adjusted under 35 U.S.C. 154(b) by 871 days.

(21) Appl. No.: 16/095,995

(22) PCT Filed: Apr. 25, 2017

(86) PCT No.: PCT/JP2017/016441
§ 371 (c)(1),
(2) Date: Oct. 24, 2018

(87) PCT Pub. No.: WO2017/188284
PCT Pub. Date: Nov. 2, 2017

(65) Prior Publication Data
US 2019/0136354 A1    May 9, 2019

(30) Foreign Application Priority Data
Apr. 26, 2016 (JP) .............................. JP2016-088458

(51) Int. Cl.
*C22C 38/60* (2006.01)
*C22C 38/02* (2006.01)
(Continued)

(52) U.S. Cl.
CPC ............... *C22C 38/60* (2013.01); *C21D 7/13* (2013.01); *C22C 38/001* (2013.01); *C22C 38/002* (2013.01); *C22C 38/02* (2013.01); *C22C 38/04* (2013.01); *C22C 38/06* (2013.01); *C22C 38/24* (2013.01); *C22C 38/42* (2013.01); *C22C 38/44* (2013.01); *C22C 38/46* (2013.01);
(Continued)

(58) Field of Classification Search
CPC ....................................................... C21C 7/06
See application file for complete search history.

(56) References Cited

FOREIGN PATENT DOCUMENTS

| JP | H0533101 A | 2/1993 |
| JP | 2004027259 A | 1/2004 |

(Continued)

OTHER PUBLICATIONS

Espacenet Machine translation of JP-2007113063-A retrieved on Jul. 16, 2021 (Year: 2007).*

(Continued)

*Primary Examiner* — Jophy S. Koshy
*Assistant Examiner* — Joshua S Carpenter
(74) *Attorney, Agent, or Firm* — Banner & Witcoff, Ltd.

(57) ABSTRACT

A non-heat treated steel for induction hardening contains, in mass %, C: 0.35 to 0.44%, Si: 0.01 to less than 0.30%, Mn: 0.80 to 1.50%, P: 0.030% or less, S: more than 0.010 to 0.095%, Cr: more than 0.10 to 0.30%, V: 0.050 to 0.200%, N: 0.0040 to 0.0200%, O: 0.0024% or less, Cu: 0.05% or less and Ni: 0.05% or less, and for which $fn1 \leq 50.0$, $fn2$: 0.70 to 1.00, and $fn3 \geq 1.30$. In the steel, a ratio of a number of Mn oxides containing oxygen in an amount of 20.0 mass % or more and Mn in an amount of 10.0 mass % or more to the number of oxides is 10.0% or less $$fn1 = 80C^2 + 55C + 13Si + 4.8Mn + 30P + 30S + 1.5Cr$$

$$fn2 = C + (Si/10) + (Mn/5) - (5S/7) + (5Cr/22) + 1.65V$$

$$fn3 = -2C - Si + 2.33Mn + 0.26Cr + V - 1.5Cu - 1.5Ni.$$

16 Claims, 2 Drawing Sheets

(51) Int. Cl.
  *C22C 38/04*  (2006.01)
  *C22C 38/42*  (2006.01)
  *C22C 38/44*  (2006.01)
  *C22C 38/46*  (2006.01)
  *C22C 38/48*  (2006.01)
  *C22C 38/50*  (2006.01)
  *C21D 9/30*  (2006.01)
  *C22C 38/24*  (2006.01)
  *C22C 38/06*  (2006.01)
  *C21D 7/13*  (2006.01)
  *C22C 38/00*  (2006.01)
  *C21C 7/06*  (2006.01)
  *C21D 1/09*  (2006.01)
  *C21D 1/02*  (2006.01)

(52) U.S. Cl.
  CPC ............. *C22C 38/48* (2013.01); *C22C 38/50* (2013.01); *C21C 7/06* (2013.01); *C21D 1/02* (2013.01); *C21D 1/09* (2013.01); *C21D 9/30* (2013.01); *C21D 2211/004* (2013.01)

(56) References Cited

FOREIGN PATENT DOCUMENTS

| | | | | |
|---|---|---|---|---|
| JP | 2007113063 A | * | 5/2007 | |
| JP | 2011026641 A | * | 2/2011 | ........... F16C 3/08 |
| JP | 2011026641 A | | 2/2011 | |

OTHER PUBLICATIONS

Espacenet Machine translation of JP-2011026641-A retrieved on Jul. 16, 2021 (Year: 2011).*

* cited by examiner

NON-HEAT TREATED STEEL FOR INDUCTION HARDENING

TECHNICAL FIELD

The present invention relates to non-heat treated steel, more particularly relates to a non-heat treated steel for induction hardening.

BACKGROUND ART

In some cases, machine structural components such as a crankshaft for an automobile or a construction vehicle are subjected to, for example, a surface hardening treatment to improve fatigue strength and wear resistance.

Among the various kinds of surface hardening treatments, induction hardening is capable of hardening only region at which hardening is required. In addition, because induction hardening includes cooling after heating to a high temperature, a deep hardened layer depth and high fatigue strength can be obtained in comparison to other surface hardening treatments such as a nitrocarburization. Therefore, machine structural components are subjected to induction hardening in many cases. For example, to improve the fatigue strength of a crankshaft, which is a kind of machine structural component, technology in which an R portion 1 of a fillet illustrated in FIG. 1 is subjected to induction hardening has been in practical use.

In recent years, there have been demands from industry to further increase the strength of machine structural components, particularly the fatigue strength. In order to increase a hardened layer depth utilizing induction hardening, it suffices to increase the output of high-frequency power and the heating time and to raise the heating temperature. However, in the case of performing induction hardening treatment at a high temperature, the heating temperature is liable to become excessively high at edge parts of the machine structural component (for example, at portions denoted by reference number 2 in the case of the crankshaft shown in FIG. 1). In particular, when the rate of temperature increase during induction hardening is high, the heating temperature is liable to become excessively high. For example, if the heating temperature becomes higher than the fusing point of the steel material of the machine structural component due to the heating temperature during induction hardening being more than 1350° C. or the like, in some cases a part of the outer layer or inside of the steel material melts and cracks occur. Hereunder, such cracks are referred to herein as "melting cracks". Melting cracks are a characteristic phenomenon that occurs in induction hardening. A steel material in which melting cracks have arisen is not suitable for practical use. Therefore, it is required to suppress the occurrence of melting cracks in steel for induction hardening.

In addition to the aforementioned fatigue strength, steel for induction hardening that is to be used in machine structural components is also required to be excellent in machinability. Therefore, to improve machinability, S is contained in steel for induction hardening. However, the aforementioned melting cracks become more liable to occur as the S content increases. Therefore, steel for induction hardening is required to have high fatigue strength and machinability while also suppressing the occurrence of melting cracks.

Examples of technology relating to steel for induction hardening are disclosed in Japanese Patent Application Publication No. 5-33101 (Patent Literature 1), Japanese Patent Application Publication No. 2004-27259 (Patent Literature 2) and Japanese Patent Application Publication No. 2011-26641 (Patent Literature 3).

A non-heat treated steel for an induction hardened crankshaft disclosed in Patent Literature 1 consists of, by mass, C: 0.40 to 0.52%, Si: 0.10 to 0.40%, Mn: 1.00 to 1.50%, S: 0.010 to 0.070%, Cr: 0.40 to 0.70%, Pb: 0.02 to 0.35%, Ca: 0.0005 to 0.0100%, O: 0.0040% or less, Al: 0.025% or less and N: 0.005 to 0.015%, with the balance being substantially Fe.

A free-cutting steel for machine structural use disclosed in Patent Literature 2 consists of, in mass %, C: 0.35 to 0.65%, Si: 0.03 to 1.0%, Mn: 0.30 to 2.50%, S: 0.015 to 0.35%, 0.060% or less and Ca: 0.0005 to 0.01%, and also contains one or more types of element selected from the group consisting of Ni: 0.1 to 3.5%, Cr: 0.1 to 2.0% and Mo: 0.05 to 1.00%, with the balance being Fe and unavoidable impurities. The sulfides in the steel have a size with a major axis of not more than 30 μm. After cutting or forging of the free-cutting steel for machine structural use, a part of the relevant component is subjected to induction hardening and then used.

A non-heat treated steel for induction hardening disclosed in Patent Literature 3 consists of, in mass %, C: 0.35 to 0.45%, Si: more than 0.30% and not more than 0.70%, Mn: 1.00 to 1.50%, P: 0.030% or less, S: 0.010 to 0.035%, Cr: 0.10 to 0.30%, Al: 0.005 to 0.050%, V: 0.100 to 0.200% and N: 0.0040 to 0.0200%, in which fn1 represented by the following Formula (1) is not more than 50 and fn2 represented by the following Formula (2) is in the range of 0.80 to 1.00, and in which the balance is Fe and impurities.

$$fn1 = 80C^2 + 55C + 13Si + 4.8Mn + 30P + 30S + 1.5Cr \quad (1)$$

$$fn2 = C + (Si/10) + (Mn/5) - (5S/7) + (5Cr/22) + 1.65V \quad (2)$$

CITATION LIST

Patent Literature

Patent Literature 1: Japanese Patent Application Publication No. 5-33101
Patent Literature 2: Japanese Patent Application Publication No. 2004-27259
Patent Literature 3: Japanese Patent Application Publication No. 2011-26641

SUMMARY OF INVENTION

Technical Problem

Patent Literature 1 describes that the non-heat treated steel disclosed therein does not require hardening and tempering. Therefore, differences in hardness due to differences in cooling rates that are based on dimensional differences are not liable to be large. In addition, the non-heat treated steel is excellent in workability. However, suppression of melting cracks that can arise during induction hardening is not discussed in Patent Literature 1.

Patent Literature 2 describes that quench cracking that arises during induction hardening decreases in the free-cutting steel for machine structural use that is disclosed therein. However, in Patent Literature 2, similarly to Patent Literature 1, suppression of melting cracks is not discussed.

In Patent Literature 3, reduction of melting cracks is investigated. However, melting cracks in the case of performing induction hardening at a high heating temperature of more than 1350° C. with respect to a steel material containing S, in particular a steel material containing S in an amount of more than 0.035% are not discussed.

Note that, although the fatigue strength increases as the hardness of a machine structural component increases, the machinability decreases. Therefore, to obtain both fatigue strength and machinability in a machine structural component in a compatible manner, it is effective to set the hardness within an appropriate range.

An objective of the present invention is to provide a non-heat treated steel for induction hardening that can suppress the occurrence of melting cracks even in a case where the heating temperature during induction hardening is more than 1350° C.

Solution to Problem

A non-heat treated steel for induction hardening according to the present invention consists of, in mass %, C: 0.35 to 0.44%, Si: 0.01 to less than 0.30%, Mn: 0.80 to 1.50%, P: 0.030% or less, S: more than 0.010 to 0.095%, Cr: more than 0.10 to 0.30%, V: 0.050 to 0.200%, N: 0.0040 to 0.0200%, O: 0.0024% or less, Cu: 0.05% or less, Ni: 0.05% or less, Al: 0 to 0.040%, Ti: 0 to 0.020%, Nb: 0 to 0.020%, Pb: 0 to 0.30%, Ca: 0 to 0.0100% and Mo: 0 to 0.20%, in which fn1 defined by Formula (1) is 50.0 or less, fn2 defined by Formula (2) is 0.70 to 1.00 and fn3 defined by Formula (3) is 1.30 or more, and the balance is Fe and impurities. In the steel, a ratio of a number of Mn oxides containing oxygen in an amount of 20.0 mass % or more and Mn in an amount of 10.0 mass % or more with respect to a number of oxides containing oxygen in an amount of 70.0 mass % or more is 10.0% or less.

$$fn1 = 80C^2 + 55C + 13Si + 4.8Mn + 30P + 30S + 1.5Cr \quad (1)$$

$$fn2 = C + (Si/10) + (Mn/5) - (5S/7) + (5Cr/22) + 1.65V \quad (2)$$

$$fn3 = -2C - Si + 2.33Mn + 0.26Cr + V - 1.5Cu - 1.5Ni \quad (3)$$

Where, a content (mass %) of the corresponding element is substituted for each symbol of an element in Formula (1) to Formula (3).

Advantageous Effect of Invention

According to the non-heat treated steel for induction hardening of the present invention, the occurrence of melting cracks is suppressed even in a case where the heating temperature during induction hardening is more than 1350° C.

DESCRIPTION OF EMBODIMENTS

Figure 1:
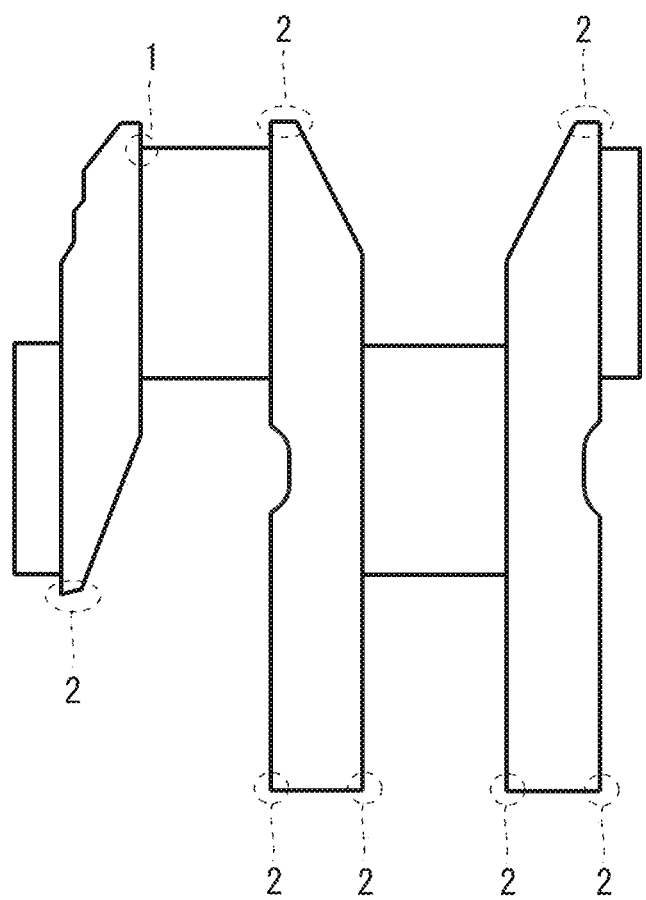
FIG. 1 is a front view illustrating one portion of a crankshaft that is a machine structural component.

The present inventors conducted detailed studies regarding regions in which melting cracks occurred in machine structural components that had been subjected to induction hardening. As a result, the present inventors found that decarburization had not occurred in regions in which melting cracks occurred. On the other hand, it was found that melting cracks did not occur in decarburized regions.

Based on the above results, the present inventors reached the conclusion that the C content influences the occurrence of melting cracks that are caused by induction hardening. Therefore, the occurrence of melting cracks during induction hardening is suppressed by lowering the C content. Therefore, the present inventors conducted further detailed studies with respect to the influence that the contents of various elements have on the occurrence of melting cracks, and also the influence thereof on mechanical properties, particularly fatigue strength. As a result, the present inventors obtained the following new findings.

[Regarding Suppression of Melting Cracks during Induction Hardening]

C, Si, Mn and Cr increase hardenability and increase fatigue strength. However, C, Si, Mn and Cr, and P and S lower the fusing point of the steel. If the fusing point of the steel is lowered, melting cracks are liable to occur during heating for induction hardening. Therefore, although C, Si, Mn and Cr are contained as essential elements for increasing fatigue strength, when melting cracks are taken into consideration, it is preferable to restrict the total content of C, Si, Mn, P, S and Cr.

Based on the results of the studies described above, the present inventors conducted further studies regarding the relation between the total content of C, Si, Mn, P, S and Cr and melting cracks. As a result, the present inventors discovered that, if fn1 defined by Formula (1) is 50.0 or less, a decrease in the fusing point of the steel is suppressed and, on the premise that fn2 and fn3 which are described later satisfy the relevant requirements, the occurrence of melting cracks during induction hardening can be suppressed.

$$fn1 = 80C^2 + 55C + 13Si + 4.8Mn + 30P + 30S + 1.5Cr \quad (1)$$

Where, the content (mass %) of a corresponding element is substituted for each symbol of an element in Formula (1).

The present inventors further investigated the mechanism of melting cracks during induction hardening at a heating temperature of more than 1350° C. As a result, the present inventors obtained the following new finding.

During induction hardening at a heating temperature of more than 1350° C., melting cracks occur that start from grain boundaries. More specifically, melting cracks occur due to C (carbon) concentrating at the vicinity of austenite (γ) grain boundaries as the result of heating. Therefore, if the concentration of C at γ grain boundaries when performing heating during induction hardening is suppressed, the occurrence of melting cracks can be suppressed.

In order to suppress an increase in the C concentration at γ grain boundaries during heating for induction hardening, it is effective to reduce the C content in the steel material. However, if the C content is low, the hardness after induction hardening decreases. In such case, high fatigue strength will not be obtained. Based on the results of the studies described above, the present inventors looked for and examined other methods that can suppress an increase in the C concentration at γ grain boundaries, and not a method that suppresses an increase in the C concentration at γ grain boundaries by decreasing the C content.

As a result, as a method for suppressing an increase in the C concentration at γ grain boundaries, the present inventors discovered a method that fixes C by means of an alloying element to thereby lower the amount of dissolved C. This point is described hereunder.

Si, Cu, and Ni have a weak affinity to C. When the contents of these elements are high, if the heating temperature during induction hardening is more than 1350° C. the grain boundaries become a more stable place for C in comparison to within the γ grains in which Si, Cu and Ni are dissolved, Therefore, C is liable to concentrate in the vicinity of the grain boundaries. Accordingly, by lowering the contents of these elements, an increase in the C concentration at the γ grain boundaries during heating when performing induction hardening can be suppressed. Therefore, even in a case where the heating temperature during induction hardening is more than 1350° C., the occurrence of melting cracks can be suppressed. Hereinafter. Si, Cu and Ni are also referred herein to as "elements that increase the C concentration at grain boundaries".

On the other hand, Mn, Cr and V have a high affinity to C. Therefore, in a case where the contents of these elements are high, the inside of the γ grains in which Mn, Cr and V dissolve is a more stable place for C in comparison to the grain boundaries. Therefore, C is liable to be present within the γ grains, and even if the heating temperature during induction hardening is more than 1350° C., it is difficult for C to concentrate at the γ grain boundaries. Accordingly, by increasing the contents of these elements, even if the heating temperature during induction hardening is more than 1350° C. the occurrence of melting cracks can be suppressed. Hereinafter, Mn, Cr and V are referred to herein as "elements that decrease the C concentration at grain boundaries".

Based on the above finding, the present inventors also investigated in detail the relation between the contents of elements that increase the C concentration at grain boundaries, the contents of elements that decrease the C concentration at grain boundaries, and the occurrence of melting cracks at a heating temperature of more than 1350° C. As a result, the present inventors discovered for the first time that, based on the premise that fn1 and fn2 which is described later satisfy the relevant requirements, if fn3 defined by Formula (3) is 1.30 or more, even if the heating temperature during induction hardening is more than 1350° C., the occurrence of melting cracks can be suppressed.

$$fn3=-2C-Si+2.33Mn+0.26Cr+V-1.5Cu-1.5Ni \quad (3)$$

Where, the content (mass %) of a corresponding element is substituted for each symbol of an element in Formula (3).

However, it was clarified by further investigation that even when the above Formula (3) is satisfied, it is possible for melting cracks to occur in some cases. Therefore, as the result of further studies, the present inventors obtained the following new finding.

Among the elements that decrease the C concentration at grain boundaries (Mn, Cr and V), Mn contributes significantly to fn3. Unless the elements that decrease the C concentration at grain boundaries are dissolved elements, the elements cannot bond with C. Therefore, the Mn solubility is preferably high. However, in the chemical composition of the present invention, Mn functions as a deoxidizing element together with Si. If Mn oxides increase as a result of Mn deoxidizing the steel, the amount of dissolved Mn that contributes to fn3 will decrease. In this case, even if fn3 is 1.30 or more, there is a possibility of melting cracks occurring due to the heating temperature being more than 1350° C.

Therefore, the present inventors conducted further studies regarding the relation between the amount of Mn oxides in the steel and the occurrence of melting cracks. As a result, the present inventors discovered that when fn1 is 50.0 or less, fn3 is 1.30 or more, and the Mn oxides satisfy the requirement described hereinafter, the occurrence of melting cracks can be suppressed even at a heating temperature that is more than 1350° C.

Inclusions containing oxygen in an amount of 20.0 mass % or more in the steel are defined as "oxides". In addition, among the aforementioned oxides, inclusions contains oxygen in an amount of 20.0 mass % or more and Mn in an amount of 10.0 mass % or more are defined as "Mn oxides". In this case, if fn1 is 50.0 or less, fn3 is 1.30 or more, and a ratio of the number of Mn oxides to the number of the aforementioned oxides (hereinafter, this ratio is referred to as "Mn oxide number ratio NR") is 10.0% or less, the occurrence of melting cracks can be suppressed even at a heating temperature of more than 1350° C.

[Regarding Fatigue Strength and Machinability]

The present inventors conducted further studies regarding the fatigue strength and machinability after hot forging of a non-heat treated steel for induction hardening based on the premise that fn1 and fn3 satisfy the aforementioned requirements. As described above, the fatigue strength and machinability have a correlation with the hardness of the steel after hot forging. Specifically, the fatigue strength increases as the hardness of the steel increases. However, the machinability decreases as the hardness of the steel increases. Therefore, by setting the hardness of the steel in an appropriate range, fatigue strength and machinability can be obtained in a compatible manner.

From the above viewpoint, the present inventors conducted further investigations regarding the total content of the elements that influence the hardness of the steel. C, Si, Mn, Cr and V increase the internal hardness of the steel material after hot forging. On the other hand, S lowers the internal hardness. Therefore, the present inventors considered that by setting the total content of these elements within an appropriate range, it is possible to obtain both fatigue strength and machinability in a compatible manner after hot forging, and therefore the present inventors conducted further studies in this regard. As a result, the present inventors discovered that if fn2 defined by Formula (2) is within the range of 0.70 to 1.00, based on the premise that fn1 and fn3 satisfy the aforementioned requirements, in the steel product after hot forging, the Rockwell hardness is in an appropriate range, and as a result excellent fatigue strength and excellent machinability are obtained.

$$fn2=C+(Si/10)+(Mn/5)-(5S/7)+(5Cr/22)+1.65V \quad (2)$$

Where, the content (mass %) of a corresponding element is substituted for each symbol of an element in Formula (2).

A non-heat treated steel for induction hardening according to the present embodiment that was completed based on the above findings consists of, in mass %, C: 0.35 to 0.44%, Si: 0.01 to less than 0.30%, Mn: 0.80 to 1.50%, P: 0.030% or less, S: more than 0.010 to 0.095%, Cr: more than 0.10 to 0.30%, V: 0.050 to 0.200%, N: 0.0040 to 0.0200%, O: 0.0024% or less, Cu: 0.005% or less, Ni: 0.05% or less, Al: 0 to 0.040%, Ti: 0 to 0.020%, Nb: 0 to 0.020%, Pb: 0 to 0.30%, Ca: 0 to 0.0100% and Mo: 0 to 0.20%, in which fn1 defined by Formula (1) is 50.0 or less, fn2 defined by Formula (2) is 0.70 to 1.00, and fn3 defined by Formula (3) is 1.30 or more, and the balance is Fe and impurities. In the steel, a ratio of a number of Mn oxides containing oxygen in an amount of 20.0 mass % or more and Mn in an amount of 10.0 mass % or more with respect to a number of oxides containing oxygen in an amount of 20.0 mass % or more is 10.0% or less.

$$fn1 = 80C^2 + 55C + 13Si + 4.8Mn + 30P + 30S + 1.5Cr \quad (1)$$

$$fn2 = C + (Si/10) + (Mn/5) - (5S/7) + (5Cr/22) + 1.65V \quad (2)$$

$$fn3 = -2C - Si + 2.33Mn + 0.26Cr + V - 1.5Cu - 1.5Ni \quad (3)$$

Where, a content (mass %) of a corresponding element is substituted for each symbol of an element in Formula (1) to Formula (3).

According to the non-heat treated steel for induction hardening of the present embodiment, the occurrence of melting cracks during heating when performing induction hardening can be suppressed. In such case, the product yield improves. Furthermore, according to the non-heat treated steel for induction hardening of the present embodiment, after hot forging in a process in which a machine structural component such as a crankshaft is produced also, the hardness of the steel material can be set in an appropriate range and, as a result, high fatigue strength and machinability are obtained.

The aforementioned non-heat treated steel for induction hardening may further contain Al in an amount of 0.005 to 0.040%.

The aforementioned non-heat treated steel for induction hardening may further contain one or more elements selected from the group consisting of Ti: 0.005 to 0.020% and Nb: 0.005 to 0.020%.

The aforementioned non-heat treated steel for induction hardening may further contain one or more elements selected from the group consisting of Pb: 0.10 to 0.30% and Ca: 0.0010 to 0.0100%.

The aforementioned non-heat treated steel for induction hardening may further contain Mo in an amount of 0.05 to 0.20%.

The non-heat treated steel for induction hardening of the present embodiment is described in detail hereunder. The symbol "%" in relation to an element means "mass %" unless specifically stated otherwise.

[Chemical Composition]

The chemical composition of the non-heat treated steel for induction hardening of the present embodiment contains the following elements.

C: 0.35 to 0.44%

Carbon (C) increases the hardness of a portion subjected to induction hardening and increases the internal hardness of the steel. If the C content is less than 0.35%, this effect is not obtained. On the other hand, if the C content is more than 0.44%, melting cracks will occur during heating for induction hardening. Therefore, the C content is in the range of 0.35 to 0.44%. A preferable lower limit of the C content is 0.37%. A preferable upper limit of the C content is 0.42%.

Si: 0.01 to Less Than 0.30%

Silicon (Si) deoxidizes the steel. Si also strengthens ferrite and increases the internal hardness of the steel. These effects are not obtained if the Si content is less than 0.01%. On the other hand, Si is an element that increases the C concentration at grain boundaries. Therefore, if the Si content is 0.30% or more, in a case where the heating temperature during induction hardening is more than 1350° C., Si promotes the occurrence of melting cracks. Accordingly, the Si content is in the range of 0.01 to less than 0.30%. A preferable lower limit of the Si content is 0.02%. A preferable upper limit of the Si content is 0.28%.

Mn: 0.80 to 1.50%

Manganese (Mn) is an element that decreases the C concentration at grain boundaries, and bonds with C to thereby fix C. Therefore, Mn can suppress the occurrence of melting cracks even when the heating temperature during induction hardening is more than 1350° C. Mn also deoxidizes the steel. In addition, Mn increases the hardening of the steel and increases the internal hardness. These effects are not obtained if the Mn content is less than 0.80%. On the other hand, if the Mn content is more than 1.50%, the internal hardness is too high and the machinability decreases. Accordingly, the Mn content is in the range of 0.80 to 1.50%. A preferable lower limit of the Mn content is 0.82%, and more preferably is 0.85%. A preferable upper limit of the Mn content is 1.48%.

P: 0.030% or Less

Phosphorus (P) is an impurity. If the P content is more than 0.030%, hot forgeability decreases. In addition, melting cracks are liable to occur during heating for induction hardening. Accordingly, the P content is 0.030% or less. A preferable upper limit of the P content is 0.025%.

S: More Than 0.010 to 0.095%

Sulfur (S) forms sulfide-based inclusions and increases the machinability of the steel. This effect is not obtained if the S content is 0.010% or less. On the other hand, if the S content is more than 0.095%, melting cracks are liable to occur during heating for induction hardening. Accordingly, the S content is in the range of more than 0.010 to 0.095%. Note that, in a case where the Si, Cu, Ni, Mn, Cr and V contents are not appropriately controlled, melting cracks are liable to occur if the S content is more than 0.035%. However, in the present embodiment, as described later, by making fn3 not less than 1.30, the contents of the elements that increase the C concentration at grain boundaries (Si, Cu, Ni) and the elements that decrease the C concentration at grain boundaries (Mn, Cr, V) are appropriately controlled. Therefore, if the S content is 0.095% or less, the occurrence of melting cracks can be suppressed. A preferable lower limit of the S content is 0.015%. A preferable upper limit of the S content is 0.070%.

Cr: More Than 0.10 to 0.30%

Chromium (Cr) is an element that decreases the C concentration at grain boundaries, and bonds with C to thereby fix C. Therefore, Cr suppresses the occurrence of melting cracks even if the heating temperature during induction hardening is more than 1350° C. In addition, Cr raises the hardenability and internal hardness of the steel. These effects are not obtained if the Cr content is 0.10% or less. On the other hand, if the Cr content is more than 0.30%, the internal hardness will be too high and the machinability of the steel will decrease. Accordingly, the Cr content is set in the range of more than 0.10 to 0.30%. A preferable lower limit of the Cr content is 0.12%. A preferable upper limit of the Cr content is 0.25%.

V: 0.050 to 0.200%

Vanadium (V) is an element that decreases the C concentration at grain boundaries, and combines with C and thereby fixes C. Therefore, V suppresses the occurrence of melting cracks even if the heating temperature during induction hardening is more than 1350° C. In addition, V precipitates in ferrite as V carbo-nitrides during a cooling process after the present non-heat treated steel for induction hardening undergoes hot forging. The V carbo-nitrides increase the hardness of the ferrite and consequently increase the internal hardness. This effect is not obtained if the V content is less than 0.050%. On the other hand, if the V content is more than 0.200%, the aforementioned effect is saturated. In addition, the production cost increases. Accordingly, the V content is in the range of 0.050 to 0.200%. A preferable lower limit of the V content is 0.055%. A preferable upper limit of the V content is 0.195%.

N: 0.0040 to 0.0200%

Nitrogen (N) forms nitrides and carbo-nitrides during a cooling process after the present non-heat treated steel for induction hardening undergoes hot forging, and thereby refines the micro-structure and causes precipitation strengthening of the steel. These effects are not obtained if the N content is less than 0.0040%. On the other hand, if the N content is more than 0.0200%, the hot forgeability of the steel decreases. Accordingly, the N content is in the range of 0.0040 to 0.0200%. A preferable lower limit of the N content is 0.0060%. A preferable upper limit of the N content is 0.0150%.

O: 0.0024% or Less

Oxygen (O) is unavoidably contained in the steel. O forms oxides in the steel, and in particular O combines with Mn that is an element that decreases the C concentration at grain boundaries, and forms Mn oxides. In this case, dissolved Mn that contributes to decreasing the C concentration at γ grain boundaries decreases. If the O content is more than 0.0024%, the dissolved Mn decreases excessively, and in a case where the heating temperature during induction hardening is more than 1350° C., melting cracks occur. In addition, if the O content is more than 0.0024%, fatigue strength is lowered by coarse oxides. Accordingly, the O content is 0.0024% or less. A preferable upper limit of the O content is 0.0020%, and more preferably is 0.0017%.

Cu: 0.05% or Less

Copper (Cu) is an impurity. Cu is an element that increases the C concentration at grain boundaries, and promotes the occurrence of melting cracks during induction hardening. Specifically, if the Cu content is more than 0.05%, the occurrence of melting cracks is promoted. Accordingly, the Cu content is 0.05% or less. A preferable upper limit of the Cu content is 0.04%.

Ni: 0.05% or Less

Nickel (Ni) is an impurity. Ni is an element that increases the C concentration at grain boundaries, and promotes the occurrence of melting cracks during induction hardening. Specifically, if the Ni content is more than 0.05%, the occurrence of melting cracks is promoted. Accordingly, the Ni content is 0.05% or less. A preferable upper limit of the Ni content is 0.04%.

The balance of the chemical composition of the non-heat treated steel for induction hardening according to the present embodiment is Fe and impurities. Here, the term "impurities" refers to substances which, during industrial production of the aforementioned steel, are mixed in from ore or scrap used as a raw material, or from the production environment or the like.

[Regarding fn1]

In addition, in the aforementioned chemical composition, fn1 that is defined by Formula (1) is not more than 50.0.

$$fn1=80C^2+55C+13Si+4.8Mn+30P+30S+1.5Cr \quad (1)$$

Where, the content (mass %) of a corresponding element is substituted for each symbol of an element in Formula (1).

Herein, fn1 is an index of melting cracks that are attributable to the fusing point of the steel. The elements C, Si, Mn, P, S and Cr each lower the fusing point of the steel. If the fusing point of the steel is lowered, melting cracks are liable to occur during heating when performing induction hardening. If fn1 is 50.0 or less, a decrease in the fusing point of the steel is suppressed, and thus the occurrence of melting cracks is suppressed. A preferable upper limit of fn1 is 49.4.

On the other hand, C, Si, Mn and Cr in fn1 increase the hardenability of the steel. Therefore, a preferable lower limit of fn1 for increasing the hardenability of the steel is 37.0.

[Regarding fn2]

In addition, in the aforementioned chemical composition, fn2 that is defined by Formula (2) is 0.70 to 1.00.

$$fn2=C+(Si/10)+(Mn/5)-(5S/7)+(5Cr/22)+1.65V \quad (2)$$

Where, the content (mass %) of a corresponding element is substituted for each symbol of an element in Formula (2).

Herein, fn2 is an index of the internal hardness of the steel. C, Si, Mn, Cr and V increase the internal hardness of the steel material after hot forging. On the other hand, S lowers the internal hardness. If fn2 is less than 0.70, the internal hardness of the steel material will be too low and the fatigue strength will decrease. On the other hand, if fn2 is more than 1.00, the internal hardness will be too high and the machinability will decrease. Accordingly, fn2 is set to be in the range of 0.70 to 1.00. A preferable lower limit of fn2 is 0.84. A preferable upper limit of fn2 is 0.98.

[Regarding fn3]

Furthermore, in the aforementioned chemical composition, fn3 that is defined by Formula (3) is 1.30 or more.

$$fn3=-2C-Si+2.33Mn+0.26Cr+V-1.5Cu-1.5Ni \quad (3)$$

Where, the content (mass %) of a corresponding element is substituted for each symbol of an element in Formula (3).

Herein, fn3 is an index of the C concentration at austenite (γ) grain boundaries at a heating temperature of more than 1350° C. during induction hardening. Si, Cu and Ni are elements that increase the C concentration at grain boundaries, and promote concentration of C at the γ grain boundaries at a heating temperature of more than 1350° C. On the other hand, Mn, Cr and V are elements that decrease the C concentration at grain boundaries, and suppress concentration of C at the γ grain boundaries at a heating temperature of more than 1350° C. If fn3 is 1.30 or more, concentration of C at the γ grain boundaries is suppressed. Therefore, even if the heating temperature during induction hardening is more than 1350° C., the occurrence of melting cracks is suppressed. A preferable lower limit of fn3 is 1.31, and more preferably is 1.33. A preferable upper limit of fn3 is 2.70, and more preferably is 150.

[Regarding Oxides in the Steel]

In addition, in the non-heat treated steel for induction hardening according to the present embodiment, a ratio of the number of Mn oxides containing oxygen in an amount of 20.0 mass % or more and Mn in an amount of 10.0 mass % or more to the number of oxides containing oxygen in an amount of 20.0 mass % or more (Mn oxide number ratio NR=number of Mn oxides/number of oxides×100) in the steel is 10.0% or less.

The Mn that contributes to fn3 is dissolved Mn. Accordingly, even when fn3 is 1.30 or more, if the amount of Mn oxides that are formed is large, the content of dissolved Mn that fixes C as an element that decreases the C concentration at grain boundaries is lowered. In this case, if the heating temperature during induction hardening is more than 1350° C., there is a possibility that melting cracks will occur.

Therefore in the non-heat treated steel for induction hardening according to the present embodiment, among the oxides in the steel, the proportion of Mn oxides is lowered to a certain extent. Inclusions containing oxygen in an amount of 20.0 mass % or more are defined herein as "oxides". In addition, among such oxides, inclusions containing oxygen in an amount of 20.0 mass % or more and Mn in an amount of 10.0 mass % or more are defined as "Mn oxides". In the non-heat treated steel for induction hardening according to the present embodiment, if fn3 is 1.30 or more and the aforementioned ratio of the number of Mn oxides to the number of oxides (Mn oxide number ratio NR) is 10.0% or less, the occurrence of melting cracks can be suppressed even at a heating temperature of more than 1350° C.

The Mn oxide number ratio NR is measured by the following method. In a case where the non-heat treated steel material for induction hardening is a steel bar, a sample including a 10 mm×15 mm rectangular observation surface that is centered on an R/2 position of the steel bar is extracted (the R/2 position is the middle position of a straight line (radius R) linking the central axis and the outer surface of the steel bar in a cross-section perpendicular to the longitudinal direction of the steel bar). The observation surface of the extracted sample is mirror-polished. Components of a plurality of inclusions within the mirror-polished observation surface are analyzed using a scanning electron microscope equipped with an energy dispersive X-ray spectroscope (EDX). The aforementioned oxides and aforementioned Mn oxides within the observation surface are then identified. The ratio of the total number of Mn oxides to the total number of oxides (=number of Mn oxides/number of oxides×100) that were identified is defined as the Mn oxide number ratio NR (%).

[Regarding Optional Elements]

The non-heat treated steel for induction hardening of the present embodiment may also contain Al in lieu of a part of Fe.

Al: 0 to 0.040%

Aluminum (Al) is an optional element, and need not be contained. If contained, Al deoxidizes the steel. If even a small amount of Al is contained, the aforementioned effect is obtained to a certain extent. However, if the Al content is more than 0.040%, Al will form coarse oxides and lead to a decrease in the fatigue strength. Accordingly, the Al content is set in the range of 0 to 0.0040%. A preferable lower limit of the Al content for more effectively obtaining the aforementioned effect is 0.005%. A preferable upper limit of the Al content is 0.030%. The term "Al content" herein means the total content of Al.

The non-heat treated steel for induction hardening of the present embodiment may further contain one or more elements selected from the group consisting of Ti and Nb in lieu of a part of Fe. These elements are optional elements, and each of these elements forms carbo-nitrides and increases the toughness of the steel.

Ti: 0 to 0.020%

Titanium (Ti) is an optional element, and need not be contained. If contained, in a cooling process after the non-heat treated steel for induction hardening is hot forged, Ti forms carbo-nitrides and suppresses coarsening of austenite grains. Therefore, the pearlite structure of the steel product after hot forging becomes fine, and the toughness of the steel material increases. If even a small amount of Ti is contained, the aforementioned effect is obtained to a certain extent. However, if the Ti content is more than 0.020%, the aforementioned effect will be saturated. In addition, the production cost will increase. Accordingly, the Ti content is in a range of 0 to 0.020%. A preferable lower limit of the Ti content for more effectively obtaining the aforementioned effect is 0.005%, and further preferably is 0.008%. A preferable upper limit of the Ti content is 0.015%.

Nb: 0 to 0.020%

Niobium (Nb) is an optional element, and need not be contained. If contained, in a cooling process after the non-heat treated steel for induction hardening is hot forged, Nb forms carbo-nitrides and suppresses coarsening of austenite grains. Therefore, the toughness of the steel product after hot forging increases. However, if the Nb content is more than 0.020%, the aforementioned effect will be saturated. In addition, the production cost will increase. Accordingly, the Nb content is in a range of 0 to 0.020%. A preferable lower limit of the Nb content for more effectively obtaining the aforementioned effect is 0.005%, and further preferably is 0.008%. A preferable upper limit of the Nb content is 0.015%.

The non-heat treated steel for induction hardening of the present embodiment may further contain one or more elements selected from the group consisting of Pb and Ca in lieu of a part of Fe. These elements are optional elements, and each of these elements increases the machinability of the steel.

Pb: 0 to 0.30%

Lead (Pb) is an optional element, and need not be contained. If contained, Pb increases the machinability of the steel. If even a small amount of Pb is contained, the aforementioned effect is obtained to a certain extent. However, if the Pb content is more than 0.30%, the hot forgeability of the steel will decrease. Accordingly, the Pb content is 0 to 0.30%. A preferable lower limit of the Pb content for more effectively obtaining the aforementioned effect is 0.10%, and further preferably is 0.15%. A preferable upper limit of the Pb content is 0.27%.

Ca: 0 to 0.0100%

Calcium (Ca) is an optional element, and need not be contained. If contained, Ca increases the machinability. If even a small amount of Ca is contained, the aforementioned effect is obtained to a certain extent. However, if the Ca content is more than 0.0100%, Ca will form coarse oxides and the fatigue strength of the steel will decrease. Accordingly, the Ca content is 0 to 0.0100%. A preferable lower limit of the Ca content for more effectively obtaining the aforementioned effect is 0.0010%, and further preferably is 0.0015%. A preferable upper limit of the Ca content is 0.0085%.

The non-heat treated steel for induction hardening of the present embodiment may further contain Mo in lieu of a part of Fe.

Mo: 0 to 0.20%

Molybdenum (Mo) is an optional element, and need not be contained. If contained, Mo increases the fatigue strength of the steel. If even a small amount of Mo is contained, the aforementioned effect is obtained to a certain extent. However, if the Mo content is more than 0.20%, the hot forgeability decreases. Accordingly, the Mo content is 0 to 0.20%. A preferable lower limit of the Mo content for more effectively obtaining the aforementioned effect is 0.05%. A preferable upper limit of the Mo content is 0.17%.

[Production Method]

An example of a method for producing the non-heat treated steel for induction hardening of the present embodiment is as follows. The method for producing the non-heat treated steel for induction hardening of the present embodiment includes a refining process, a casting process and a hot working process.

[Refining Process]

In the refining process, molten steel having the aforementioned chemical composition is produced. Specifically, refining is performed by using a converter to blow oxygen into hot metal, to thereby produce molten steel to which Si and Mn has not been added (primary refining). The molten steel that has undergone primary refining is then subjected to secondary refining to deoxidize the molten steel. At this time, in the secondary refining, Si is added to the molten steel prior to an Mn source to deoxidize the molten steel. Then after adding the Si, an Mn source is added to the molten steel. The Mn source is an Fe—Mn alloy and/or pure metallic manganese. The Mn content in the Mn source is, in at %, 60 to 100%, and the oxygen (O) content in the Mn source is 1.0 at % or less.

If the aforementioned Mn source is added to the molten steel prior to the Si, the Mn functions as a deoxidizer. Therefore, an excessive amount of Mn oxides are formed. In this case, the Mn oxide number ratio NR is more than 10.0%. In the secondary refining, by adding the aforementioned Mn source to the molten steel after addition of Si, the Mn oxide number ratio can be decreased to 10.0% or less. Note that, even if the Mn source is added to the molten steel after addition of Si, in a case where the oxygen (O) content in the Mn source is more than 1.0 at %, an excessive amount of Mn oxides is formed. Therefore, an Mn oxide number ratio NR is more than 10.0%.

Note that, Si and the Mn source are added to the molten steel in amounts such that the chemical composition of the molten steel after addition of Si and addition of the Mn source in the secondary refining is within the range of the chemical composition of the non-heat treated steel for induction hardening of the present embodiment.

[Casting Process]

In the casting process, a cast piece (slab or bloom) or an ingot is produced by a well-known casting method using molten steel. The casting method is, for example, a continuous casting process or an ingot-making process.

[Hot Working Process]

In the hot working process, hot working is performed on the cast piece or ingot that was produced in the aforementioned casting process, to thereby produce the non-heat treated steel for induction hardening of the present embodiment. The non-heat treated steel for induction hardening of the present embodiment is, for example, a steel bar. The hot working process, for example, includes a rough rolling process and a finish rolling process. The rough rolling process is, for example, blooming. The finish rolling process is, for example, finish rolling using a continuous mill. In the continuous mill, for example, a horizontal stand having a pair of horizontal rolls and a vertical stand having a pair of vertical rolls are alternately arranged in a row. A heating temperature in the rough rolling process and the finish rolling process is, for example, in a range of 1000 to 1300° C.

In the aforementioned hot working process, the non-heat treated steel for induction hardening is produced by hot rolling. However, the non-heat treated steel for induction hardening may be produced by hot forging instead of hot rolling.

The aforementioned non-heat treated steel for induction hardening is produced as described above. The production method described above includes a hot working process. However, the hot working process may be omitted from the present production method. That is, the non-heat treated steel for induction hardening of the present embodiment may be a casting (a cast piece or an ingot).

Further, the steel of the present embodiment is a non-heat treated steel. Accordingly, quenching and tempering can be omitted from the process for producing the non-heat treated steel for induction hardening.

[Method for Producing Machine Structural Components]

An example of a method for producing a machine structural component using the non-heat treated steel for induction hardening of the present embodiment is as follows. The aforementioned non-heat treated steel material for induction hardening (cast piece, ingot, billet or steel bar) is subjected to hot forging to produce an intermediate product having the rough shape of the machine structural component (for example, a crankshaft). The produced intermediate product is then allowed to cool in the atmosphere. The intermediate product is cut into a predetermined shape by machining. After cutting, the intermediate product is subjected to induction hardening. A machine structural component is produced by the above process.

In the induction hardening, the heating temperature is adjusted according to the required hardened layer depth. In the case of making the depth of the hardened layer large, the heating temperature will be a high temperature and in some cases the heating temperature can be more than 1350° C. In the case of producing a machine structural component, as typified by a crankshaft, using the non-heat treated steel for induction hardening of the present embodiment, even if induction hardening is performed at a high temperature of more than 1350° C., the occurrence of melting cracks is suppressed. In addition, after hot forging of the machine structural component, the hardness thereof can be adjusted, and excellent fatigue strength and machinability is obtained.

EXAMPLES

A plurality of non-heat treated steels for induction hardening having various chemical compositions were produced. Using the produced steels, the presence/absence of melting cracks in the respective steels after induction hardening and the internal hardness of the steels after hot forging were evaluated.

[Test Method]

[Production of Non-Heat Treated Steel for Induction Hardening]

Primary refining and secondary refining were performed using a 70-ton converter, and molten steels having the chemical compositions shown in Table 1 and Table 2 were produced.

TABLE 1

| Test No. | Chemical Composition (unit is mass %; balance is Fe and impurities) | | | | | | | | | | | | | |
|---|---|---|---|---|---|---|---|---|---|---|---|---|---|---|
| | C | Si | Mn | P | S | Cr | V | N | O | Cu | Ni | fn1 | fn2 | fn3 |
| 1 | 0.44 | 0.21 | 1.10 | 0.015 | 0.022 | 0.20 | 0.144 | 0.0070 | 0.0015 | 0.01 | 0.01 | 49.1 | 0.95 | 1.64 |
| 2 | 0.42 | 0.22 | 1.15 | 0.013 | 0.025 | 0.21 | 0.124 | 0.0081 | 0.0012 | 0.02 | 0.01 | 47.0 | 0.91 | 1.75 |
| 3 | 0.37 | 0.20 | 1.43 | 0.017 | 0.022 | 0.18 | 0.143 | 0.0079 | 0.0019 | 0.01 | 0.02 | 42.2 | 0.94 | 2.54 |
| 4 | 0.35 | 0.20 | 1.05 | 0.012 | 0.019 | 0.19 | 0.151 | 0.0076 | 0.0009 | 0.01 | 0.01 | 37.9 | 0.86 | 1.72 |

TABLE 1-continued

| | | | | | | | | | | | | | | |
|---|---|---|---|---|---|---|---|---|---|---|---|---|---|---|
| 5 | 0.45 | 0.22 | 1.02 | 0.014 | 0.014 | 0.15 | 0.142 | 0.0091 | 0.0013 | 0.01 | 0.01 | 49.8 | 0.93 | 1.41 |
| 6 | 0.34 | 0.21 | 1.42 | 0.022 | 0.050 | 0.25 | 0.140 | 0 0113 | 0.0014 | 0.02 | 0.02 | 40.0 | 0.90 | 2.56 |
| 7 | 0.39 | 0.29 | 1.10 | 0.011 | 0.022 | 0.21 | 0.142 | 0.0081 | 0.0012 | 0.01 | 0.01 | 44.0 | 0.91 | 1.66 |
| 8 | 0.39 | 0.28 | 1.33 | 0.017 | 0.055 | 0.23 | 0.166 | 0.0095 | 0.0015 | 0.02 | 0.02 | 46.1 | 0.97 | 2.20 |
| 9 | 0.41 | 0.02 | 1.00 | 0.014 | 0.021 | 0.20 | 0.144 | 0.0079 | 0.0011 | 0.01 | 0.01 | 42.4 | 0.88 | 1.66 |
| 10 | 0.40 | 0.01 | 1.04 | 0.012 | 0.024 | 0.21 | 0.147 | 0.0075 | 0.0012 | 0.02 | 0.02 | 41.3 | 0.88 | 1.75 |
| 11 | 0.41 | 0.31 | 1.10 | 0.013 | 0.026 | 0.22 | 0.110 | 0.0091 | 0.0010 | 0.01 | 0.01 | 46.8 | 0.87 | 1.57 |
| 12 | 0.40 | 0.22 | 1.49 | 0.012 | 0.022 | 0.21 | 0.139 | 0.0090 | 0.0012 | 0.02 | 0.02 | 46.1 | 0.98 | 2.59 |
| 13 | 0.39 | 0.05 | 0.82 | 0.015 | 0.035 | 0.27 | 0.185 | 0.0082 | 0.0014 | 0.01 | 0.01 | 40.1 | 0.90 | 1.31 |
| 14 | 0.40 | 0.24 | 1.55 | 0.014 | 0.024 | 0.19 | 0.142 | 0.0071 | 0.0013 | 0.01 | 0.03 | 46.8 | 0.99 | 2.70 |
| 15 | 0.37 | 0.02 | 0.79 | 0.014 | 0.035 | 0.28 | 0.195 | 0.0091 | 0.0014 | 0.01 | 0.01 | 37.2 | 0.89 | 1.32 |
| 16 | 0.39 | 0.21 | 1.10 | 0.027 | 0.022 | 0.20 | 0.145 | 0.0085 | 0.0012 | 0.01 | 0.01 | 43.4 | 0.90 | 1.74 |
| 17 | 0.39 | 0.19 | 1.07 | 0.034 | 0.021 | 0.21 | 0.151 | 0.0079 | 0.0011 | 0.02 | 0.01 | 43.2 | 0.90 | 1.68 |
| 18 | 0.40 | 0.20 | 1.10 | 0.014 | 0.094 | 0.21 | 0.162 | 0.0081 | 0.0013 | 0.01 | 0.01 | 46.2 | 0.89 | 1.75 |
| 19 | 0.39 | 0.21 | 1.12 | 0.012 | 0.070 | 0.20 | 0.165 | 0.0078 | 0.0012 | 0.02 | 0.01 | 44.5 | 0.90 | 1.79 |
| 20 | 0.41 | 0.21 | 1.09 | 0.012 | 0.016 | 0.20 | 0.143 | 0.0082 | 0.0012 | 0.01 | 0.01 | 45.1 | 0.92 | 1.67 |
| 21 | 0.39 | 0.19 | 1.08 | 0.013 | 0.102 | 0.22 | 0.151 | 0.0092 | 0.0012 | 0.01 | 0.02 | 45.1 | 0.85 | 1.71 |
| 22 | 0.39 | 0.22 | 1.06 | 0.012 | 0.023 | 0.29 | 0.141 | 0.0081 | 0.0012 | 0.01 | 0.01 | 43.1 | 0.91 | 1.66 |
| 23 | 0.38 | 0.24 | 0.99 | 0.010 | 0.052 | 0.25 | 0.101 | 0.0077 | 0.0015 | 0.01 | 0.01 | 42.6 | 0.79 | 1.44 |
| 24 | 0.39 | 0.20 | 1.02 | 0.011 | 0.061 | 0.12 | 0.112 | 0.0096 | 0.0011 | 0.01 | 0.01 | 43.5 | 0.78 | 1.51 |
| 25 | 0.39 | 0.21 | 1.09 | 0.016 | 0.025 | 0.11 | 0.148 | 0.0085 | 0.0011 | 0.01 | 0.01 | 43.0 | 0.88 | 1.70 |
| 26 | 0.40 | 0.22 | 1.12 | 0.015 | 0.025 | 0.35 | 0.145 | 0.0084 | 0.0009 | 0.02 | 0.02 | 44.8 | 0.95 | 1.77 |
| 27 | 0.41 | 0.20 | 1.10 | 0.013 | 0.021 | 0.08 | 0.144 | 0.0087 | 0.0015 | 0.01 | 0.01 | 45.0 | 0.89 | 1.68 |
| 28 | 0.41 | 0.18 | 1.11 | 0.014 | 0.022 | 0.21 | 0.145 | 0.0079 | 0.0014 | 0.01 | 0.02 | 45.1 | 0.92 | 1.74 |
| 29 | 0.40 | 0.21 | 1.12 | 0.012 | 0.024 | 0.19 | 0.144 | 0.0084 | 0.0009 | 0.02 | 0.01 | 44.3 | 0.91 | 1.75 |
| 30 | 0.38 | 0.21 | 1.11 | 0.012 | 0.022 | 0.22 | 0.198 | 0.0090 | 0.0012 | 0.02 | 0.03 | 41.9 | 0.98 | 1.80 |
| 31 | 0.37 | 0.19 | 0.91 | 0.015 | 0.028 | 0.21 | 0.195 | 0.0132 | 0.0011 | 0.01 | 0.02 | 39.7 | 0.92 | 1.39 |

| Test No. | Chemical Composition (unit is mass %; balance is Fe and impurities) | | | | | | Addition Order | NR (%) | Melting Cracks | HRC |
|---|---|---|---|---|---|---|---|---|---|---|
| | Al | Ti | Nb | Pb | Ca | Mo | | | | |
| 1 | 0.014 | — | — | — | — | — | Si→Mn | 4.1 | A | B |
| 2 | 0.012 | — | — | — | — | — | Si→Mn | 5.2 | A | A |
| 3 | 0.020 | — | — | — | — | — | Si→Mn | 3.9 | A | A |
| 4 | 0.015 | — | — | — | — | — | Si→Mn | 3.8 | A | B |
| 5 | 0.013 | — | — | — | — | — | Si→Mn | 4.9 | X | A |
| 6 | 0.013 | — | — | — | — | — | Si→Mn | 2.8 | A | X0 |
| 7 | 0.012 | — | — | — | — | — | Si→Mn | 4.1 | A | A |
| 8 | 0.013 | — | — | — | — | — | Si→Mn | 3.2 | A | A |
| 9 | 0.015 | — | — | — | — | — | Si→Mn | 5.4 | A | A |
| 10 | 0.016 | — | — | — | — | — | Si→Mn | 4.2 | A | A |
| 11 | 0.012 | — | — | — | — | — | Si→Mn | 2.7 | X | A |
| 12 | 0.011 | — | — | — | — | — | Si→Mn | 1.7 | A | B |
| 13 | 0.010 | — | — | — | — | — | Si→Mn | 2.1 | A | B |
| 14 | 0.015 | — | — | — | — | — | Si→Mn | 4.1 | A | X1 |
| 15 | 0.017 | — | — | — | — | — | Si→Mn | 2.4 | X | X0 |
| 16 | 0.014 | — | — | — | — | — | Si→Mn | 4.2 | A | A |
| 17 | 0.016 | — | — | — | — | — | Si→Mn | 5.3 | X | A |
| 18 | 0.011 | — | — | — | — | — | Si→Mn | 1.3 | A | A |
| 19 | 0.013 | — | — | — | — | — | Si→Mn | 0.8 | A | A |
| 20 | 0.012 | — | — | — | — | — | Si→Mn | 3.7 | A | A |
| 21 | 0.012 | — | — | — | — | — | Si→Mn | 1.2 | X | B |
| 22 | 0.011 | — | — | — | — | — | Si→Mn | 4.3 | A | A |
| 23 | 0.019 | — | — | — | — | — | Si→Mn | 2.4 | A | A |
| 24 | 0.018 | — | — | — | — | — | Si→Mn | 3.2 | A | B |
| 25 | 0.015 | — | — | — | — | — | Si→Mn | 4.1 | A | B |
| 26 | 0.016 | — | — | — | — | — | Si→Mn | 5.0 | A | X1 |
| 27 | 0.013 | — | — | — | — | — | Si→Mn | 4.9 | X | X0 |
| 28 | 0.039 | — | — | — | — | — | Si→Mn | 3.0 | A | A |
| 29 | 0.030 | — | — | — | — | — | Si→Mn | 4.1 | A | A |
| 30 | 0.014 | — | — | — | — | — | Si→Mn | 2.8 | A | A |
| 31 | 0.021 | — | — | — | — | — | Si→Mn | 4.0 | A | A |

TABLE 2

| Test No. | Chemical Composition (unit is mass %; balance is Fe and impurities) | | | | | | | | | | | | | |
|---|---|---|---|---|---|---|---|---|---|---|---|---|---|---|
| | C | Si | Mn | P | S | Cr | V | N | O | Cu | Ni | fn1 | fn2 | fn3 |
| 32 | 0.39 | 0.24 | 1.05 | 0.013 | 0.029 | 0.24 | 0.055 | 0.0088 | 0.0009 | 0.01 | 0.01 | 43.4 | 0.75 | 1.51 |
| 33 | 0.39 | 0.21 | 1.12 | 0.014 | 0.025 | 0.20 | 0.052 | 0.0082 | 0.0011 | 0.01 | 0.01 | 43.2 | 0.75 | 1.69 |
| 34 | 0.39 | 0.20 | 1.08 | 0.013 | 0.021 | 0.20 | 0.047 | 0.0070 | 0.0010 | 0.01 | 0.01 | 42.7 | 0.73 | 1.61 |
| 35 | 0.40 | 0.20 | 1.14 | 0.012 | 0.025 | 0.20 | 0.141 | 0.0185 | 0.0010 | 0.02 | 0.02 | 44.3 | 0.91 | 1.79 |
| 36 | 0.39 | 0.22 | 1.10 | 0.014 | 0.025 | 0.21 | 0.142 | 0.0150 | 0.0012 | 0.01 | 0.01 | 43.2 | 0.90 | 1.73 |
| 37 | 0.39 | 0.18 | 1.09 | 0.015 | 0.026 | 0.19 | 0.147 | 0.0060 | 0.0011 | 0.01 | 0.02 | 42.7 | 0.89 | 1.73 |
| 38 | 0.39 | 0.25 | 1.10 | 0.013 | 0.022 | 0.22 | 0.145 | 0.0041 | 0.0009 | 0.01 | 0.01 | 43.5 | 0.91 | 1.71 |

TABLE 2-continued

| 39 | 0.41 | 0.24 | 1.14 | 0.013 | 0.024 | 0.20 | 0.144 | 0.0039 | 0.0013 | 0.01 | 0.01 | 46.0 | 0.93 | 1.76 |
|---|---|---|---|---|---|---|---|---|---|---|---|---|---|---|
| 40 | 0.39 | 0.21 | 1.21 | 0.015 | 0.022 | 0.21 | 0.164 | 0.0087 | 0.0023 | 0.02 | 0.01 | 43.6 | 0.96 | 2.00 |
| 41 | 0.41 | 0.21 | 1.18 | 0.012 | 0.021 | 0.19 | 0.139 | 0.0081 | 0.0020 | 0.01 | 0.02 | 45.7 | 0.92 | 1.86 |
| 42 | 0.39 | 0.20 | 1.11 | 0.012 | 0.022 | 0.19 | 0.141 | 0.0079 | 0.0017 | 0.01 | 0.01 | 42.9 | 0.89 | 1.77 |
| 43 | 0.39 | 0.22 | 1.12 | 0.014 | 0.022 | 0.20 | 0.145 | 0.0090 | 0.0026 | 0.01 | 0.01 | 43.2 | 0.90 | 1.78 |
| 44 | 0.40 | 0.15 | 1.41 | 0.011 | 0.021 | 0.20 | 0.151 | 0.0075 | 0.0011 | 0.04 | 0.02 | 44.8 | 0.98 | 2.45 |
| 45 | 0.39 | 0.03 | 1.38 | 0.012 | 0.027 | 0.19 | 0.149 | 0.0081 | 0.0012 | 0.07 | 0.04 | 42.1 | 0.94 | 2.44 |
| 46 | 0.41 | 0.11 | 1.12 | 0.014 | 0.025 | 0.21 | 0.144 | 0.0079 | 0.0009 | 0.02 | 0.04 | 44.3 | 0.91 | 1.79 |
| 47 | 0.42 | 0.04 | 1.14 | 0.013 | 0.024 | 0.20 | 0.130 | 0.0082 | 0.0013 | 0.04 | 0.07 | 44.6 | 0.89 | 1.79 |
| 48 | 0.42 | 0.27 | 1.47 | 0.012 | 0.025 | 0.19 | 0.135 | 0.0081 | 0.0012 | 0.02 | 0.01 | 49.2 | 0.99 | 2.45 |
| 49 | 0.37 | 0.03 | 0.86 | 0.014 | 0.021 | 0.13 | 0.180 | 0.0082 | 0.0010 | 0.01 | 0.01 | 37.1 | 0.86 | 1.42 |
| 50 | 0.42 | 0.27 | 1.39 | 0.024 | 0.065 | 0.24 | 0.142 | 0.0090 | 0.0009 | 0.02 | 0.02 | 50.4 | 0.97 | 2.27 |
| 51 | 0.40 | 0.19 | 1.17 | 0.011 | 0.019 | 0.20 | 0.187 | 0.0079 | 0.0011 | 0.01 | 0.03 | 44.1 | 0.99 | 1.92 |
| 52 | 0.41 | 0.21 | 1.12 | 0.014 | 0.021 | 0.21 | 0.175 | 0.0081 | 0.0012 | 0.01 | 0.01 | 45.5 | 0.98 | 1.78 |
| 53 | 0.38 | 0.24 | 0.95 | 0.013 | 0.022 | 0.15 | 0.090 | 0.0082 | 0.0012 | 0.01 | 0.01 | 41.4 | 0.76 | 1.31 |
| 54 | 0.39 | 0.06 | 0.92 | 0.013 | 0.021 | 0.17 | 0.065 | 0.0082 | 0.0014 | 0.01 | 0.01 | 40.1 | 0.71 | 1.38 |
| 55 | 0.41 | 0.22 | 1.18 | 0.012 | 0.022 | 0.22 | 0.191 | 0.0084 | 0.0018 | 0.01 | 0.02 | 45.9 | 1.02 | 1.91 |
| 56 | 0.37 | 0.05 | 0.86 | 0.011 | 0.023 | 0.25 | 0.060 | 0.0079 | 0.0012 | 0.01 | 0.01 | 37.5 | 0.69 | 1.31 |
| 57 | 0.40 | 0.27 | 0.95 | 0.012 | 0.020 | 0.21 | 0.141 | 0.0087 | 0.0010 | 0.01 | 0.01 | 44.1 | 0.88 | 1.31 |
| 58 | 0.42 | 0.28 | 1.01 | 0.014 | 0.024 | 0.11 | 0.140 | 0.0082 | 0.0013 | 0.04 | 0.04 | 47.0 | 0.89 | 1.28 |
| 59 | 0.39 | 0.24 | 1.12 | 0.013 | 0.022 | 0.16 | 0.142 | 0.0079 | 0.0012 | 0.01 | 0.01 | 43.4 | 0.89 | 1.74 |
| 60 | 0.39 | 0.23 | 1.14 | 0.011 | 0.021 | 0.21 | 0.138 | 0.0085 | 0.0009 | 0.01 | 0.01 | 43.4 | 0.90 | 1.81 |
| 61 | 0.40 | 0.21 | 1.15 | 0.013 | 0.023 | 0.21 | 0.130 | 0.0081 | 0.0012 | 0.02 | 0.01 | 44.4 | 0.90 | 1.81 |
| 62 | 0.42 | 0.20 | 1.16 | 0.012 | 0.025 | 0.22 | 0.143 | 0.0088 | 0.0011 | 0.01 | 0.02 | 46.8 | 0.94 | 1.82 |
| 63 | 0.39 | 0.22 | 1.15 | 0.011 | 0.023 | 0.24 | 0.090 | 0.0092 | 0.0014 | 0.01 | 0.01 | 43.4 | 0.83 | 1.80 |
| 64 | 0.38 | 0.21 | 1.12 | 0.011 | 0.020 | 0.16 | 0.141 | 0.0070 | 0.0013 | 0.01 | 0.02 | 41.7 | 0.88 | 1.78 |
| 65 | 0.41 | 0.19 | 1.21 | 0.010 | 0.021 | 0.21 | 0.123 | 0.0069 | 0.0012 | 0.01 | 0.01 | 45.5 | 0.91 | 1.96 |
| 66 | 0.42 | 0.17 | 1.04 | 0.009 | 0.019 | 0.20 | 0.061 | 0.0082 | 0.0013 | 0.02 | 0.01 | 45.6 | 0.78 | 1.48 |
| 67 | 0.41 | 0.22 | 1.10 | 0.010 | 0.024 | 0.19 | 0.085 | 0.0085 | 0.0011 | 0.01 | 0.02 | 45.4 | 0.82 | 1.61 |
| 68 | 0.41 | 0.28 | 0.98 | 0.010 | 0.022 | 0.24 | 0.091 | 0.0065 | 0.0014 | 0.01 | 0.01 | 45.7 | 0.82 | 1.31 |
| 69 | 0.42 | 0.27 | 1.01 | 0.012 | 0.023 | 0.18 | 0.087 | 0.0081 | 0.0011 | 0.02 | 0.02 | 46.9 | 0.82 | 1.32 |
| 70 | 0.42 | 0.26 | 1.42 | 0.021 | 0.067 | 0.20 | 0.110 | 0.0077 | 0.0012 | 0.01 | 0.01 | 50.3 | 0.91 | 2.34 |
| 71 | 0.41 | 0.27 | 0.97 | 0.011 | 0.019 | 0.19 | 0.090 | 0.0080 | 0.0011 | 0.01 | 0.02 | 45.3 | 0.81 | 1.26 |

| Test No. | Chemical Composition (unit is mass %; balance is Fe and impurities) | | | | | | Addition Order | NR (%) | Melting Cracks | HRC |
|---|---|---|---|---|---|---|---|---|---|---|
| | Al | Ti | Nb | Pb | Ca | Mo | | | | |
| 32 | 0.019 | — | — | — | — | — | Si→Mn | 3.9 | A | B |
| 33 | 0.015 | — | — | — | — | — | Si→Mn | 5.1 | A | B |
| 34 | 0.015 | — | — | — | — | — | Si→Mn | 3.8 | X | X0 |
| 35 | 0.012 | — | — | — | — | — | Si→Mn | 4.2 | A | A |
| 36 | 0.015 | — | — | — | — | — | Si→Mn | 5.4 | A | A |
| 37 | 0.011 | — | — | — | — | — | Si→Mn | 5.1 | A | A |
| 38 | 0.011 | — | — | — | — | — | Si→Mn | 4.2 | A | A |
| 39 | 0.014 | — | — | — | — | — | Si→Mn | 3.8 | A | X0 |
| 40 | 0.011 | — | — | — | — | — | Si→Mn | 2.9 | A | A |
| 41 | 0.012 | — | — | — | — | — | Si→Mn | 3.9 | A | A |
| 42 | 0.015 | — | — | — | — | — | Si→Mn | 4.1 | A | A |
| 43 | 0.021 | — | — | — | — | — | Si→Mn | 5 | X | A |
| 44 | 0.013 | — | — | — | — | — | Si→Mn | 4.1 | A | A |
| 45 | 0.015 | — | — | — | — | — | Si→Mn | 4.7 | X | A |
| 46 | 0.011 | — | — | — | — | — | Si→Mn | 3.8 | A | A |
| 47 | 0.012 | — | — | — | — | — | Si→Mn | 4.1 | X | A |
| 48 | 0.012 | — | — | — | — | — | Si→Mn | 4.9 | A | A |
| 49 | 0.014 | — | — | — | — | — | Si→Mn | 3.8 | A | A |
| 50 | 0.017 | — | — | — | — | — | Si→Mn | 1.9 | X | A |
| 51 | 0.011 | — | — | — | — | — | Si→Mn | 3.9 | A | B |
| 52 | 0.010 | — | — | — | — | — | Si→Mn | 5.4 | A | B |
| 53 | 0.014 | — | — | — | — | — | Si→Mn | 3.6 | A | B |
| 54 | 0.013 | — | — | — | — | — | Si→Mn | 4.9 | A | B |
| 55 | 0.011 | — | — | — | — | — | Si→Mn | 3.7 | A | X1 |
| 56 | 0.012 | — | — | — | — | — | Si→Mn | 2.6 | A | X0 |
| 57 | 0.012 | — | — | — | — | — | Si→Mn | 3.8 | A | A |
| 58 | 0.010 | — | — | — | — | — | Si→Mn | 4.9 | X | A |
| 59 | 0.007 | 0.019 | — | — | — | — | Si→Mn | 4.1 | A | A |
| 60 | 0.010 | — | 0.02 | — | — | — | Si→Mn | 4.2 | A | A |
| 61 | 0.014 | — | — | 0.28 | — | — | Si→Mn | 5.1 | A | A |
| 62 | 0.015 | — | — | — | 0.01 | — | Si→Mn | 5.3 | A | A |
| 63 | 0.017 | — | — | — | — | 0.19 | Si→Mn | 4.8 | A | A |
| 64 | — | — | — | — | — | — | Si→Mn | 3.9 | A | A |
| 65 | — | — | — | — | — | — | Si→Mn | 4.2 | A | A |
| 66 | — | — | — | — | — | — | Mn→Si | 21.0 | X | A |
| 67 | 0.015 | — | — | — | — | — | Mn→Si | 13.8 | X | A |
| 68 | — | — | — | — | — | — | Si→Mn+ | 16.1 | X | B |
| 69 | 0.012 | — | — | — | — | — | Si→Mn+ | 11.4 | X | A |
| 70 | — | — | — | — | — | — | Si→Mn | 0.9 | X | A |
| 71 | — | — | — | — | — | — | Si→Mn | 4.9 | X | A |

In a deoxidation process during the secondary refining, in Test Nos. 1 to 65, after Si was added to the molten steel, an Fe—Mn alloy (oxygen content of 1.0 at % or less) as an Mn source was added (described as "SiMn" in the "addition order" column in Table 1 and Table 2), In Test Nos. 66 and 67, in the deoxidation process, after adding the aforementioned Fe—Mn alloy (oxygen content of 1.0 at % or less) to the molten steel, Si was added (described as "Mn→Si" in the "addition order" column in Table 1 and Table 2). In Test Nos. 68 and 69, in the deoxidation process, after adding the Si to the molten steel, an Fe—Mn alloy (oxygen content of more than 1.0 at %) as an Mn source was added (described as "Si→Mn+" in the "addition order" column in Table 1 and Table 2).

A cast piece (bloom) having a transverse cross-section of 300 mm×400 mm was produced by continuous casting process using the produced molten steel. The cast piece was subjected to blooming to produce a billet having a transverse cross-section of 180 mm×180 mm. After heating the billet to 1250° C., the billet was hot rolled to produce a steel bar (non-heat treated steel for induction hardening) having a diameter of 80 mm.

[Melting Cracks Evaluation Test]

A test specimen having a width of 10 mm, a thickness of 3 mm, and a length of 10 mm was prepared by machining from an R/2 position of a cross-section perpendicular to the longitudinal direction of the produced steel bar (the R/2 position is the middle position of a straight line (radius R) linking the central axis and the outer surface of the steel bar in a cross-section perpendicular to the longitudinal direction of the steel bar). The longitudinal direction of the test specimen was parallel to the longitudinal direction of the steel bar. Further, a central axis parallel to the longitudinal direction of the test specimen matched the R/2 position.

A simulation test of induction hardening was performed with respect to the aforementioned test specimen using a test apparatus (trade name "Thermal Cycle Testing Device") made by Fuji Electronic industrial Co., Ltd. Specifically, a high-frequency coil was used to heat the test specimen to 1380° C. at a rate of temperature increase of 100° C./sec. The test specimen was then held for 10 seconds at 1380° C. Thereafter, the test specimen was subjected to water cooling.

After the test specimen was water-cooled, a cross-section (observation surface) perpendicular to the longitudinal direction of the test specimen was subjected to mechanical polishing. After undergoing the mechanical polishing, the observation surface was etched with a picral reagent. The etched observation surface was observed under an optical microscope with a magnification of 400 times, and the presence or absence of melting cracks was checked by visual observation. The observation surface was 250 μm×400 μm.

Figure 2:
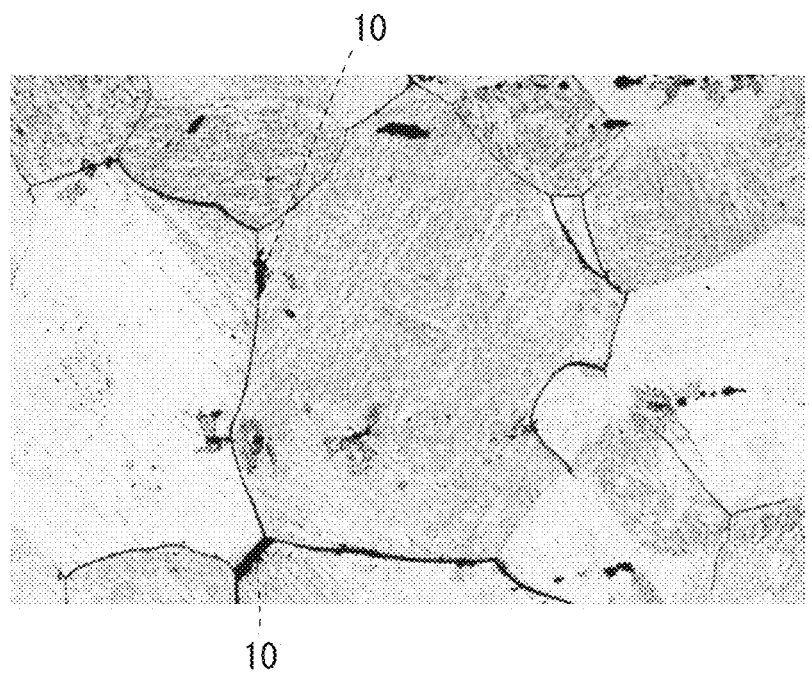
FIG. 2 is a micro-structure photographic image obtained in a case where, in the Examples, a test specimen of a non-heat treated steel for induction hardening that is a Comparative Example was heated to 1380° C. at a rate of temperature increase of 100° C./sec and held at that temperature for 10 seconds, and thereafter subjected to water cooling.
Figure 3:
FIG. 3 is a micro-structure photographic image obtained in a case where, in the Examples, a test specimen of a non-heat treated steel for induction hardening that is an Inventive Example of the present invention was heated to 1380° C. at a rate of temperature increase of 100° C./sec and held at that temperature for 10 seconds, and thereafter subjected to water cooling.

FIG. 2 is a photographic image of a micro-structure (Test No. 45) in which melting cracks occurred. FIG. 3 is a photographic image of a micro-structure (normal micro-structure: Test No. 16) in which melting cracks did not occur.

In a case where, in the micro-structure of the observation surface, a region having a width of 5 μm or more that was clearly corroded was observed at a grain boundary (for example, a region denoted by reference numeral 10 in FIG. 2), it was determined that a melting crack occurred (indicated by "X" in a "melting cracks" column in Table 1 and Table 2). On the other hand, in a case where a corroded region was not observed at a grain boundary, as in the micro-structure shown in FIG. 3, it was determined that melting cracks did not occur (indicated by "A" in the "melting cracks" column in Table 1 and Table 2). As shown in FIG. 2 and FIG. 3, it was possible to confirm the presence or absence of melting cracks.

[Rockwell Hardness Test]

A heat treatment that simulated cooling after hot forging was performed on the produced steel bar. Specifically, the steel bar was heated to 1100° C. and held for 30 minutes at that temperature. Thereafter, the steel bar was allowed to cool in the atmosphere.

The Rockwell C hardness was measured at four points in accordance with JIS Z 2245 (2011) at an R/2 portion (10 mm×10 mm) centering on the R/2 position of a cross-section perpendicular to the longitudinal direction of the steel bar after the heat treatment. The average value of the hardness determined at the four points was defined as the "HRC hardness".

It was revealed that, if the HRC hardness that is the internal hardness is 20 or more, sufficient fatigue strength is obtained in the machine structural component after hot forging. On the other hand, if the HRC hardness is more than 28, the machinability decreases. Therefore, the obtained HRC hardness values were evaluated as shown in Table 3.

TABLE 3

| HRC Hardness | Evaluation |
| --- | --- |
| More than 28 | X1 (Fail: machinability is low) |
| 26 or more-28 or less | B (Good: fatigue strength and machinability are good) |
| 22 or more-less than 26 | A (Excellent: excellent in fatigue strength and machinability) |
| 20 or more-less than 22 | B (Good: fatigue strength and machinability are good) |
| Less than 20 | X0 (Fail: fatigue strength is low) |

[Mn Oxide Number Ratio NR Measurement Test]

The Mn oxide number ratio NR of the non-heat treated steel for induction hardening of each test number was measured by the following method. From the steel bar of each test number, a sample including a 10 mm×15 mm rectangular observation surface that was centered on an R/2 position of the steel bar was extracted (the R/2 position is the middle position of a straight line (radius R) linking the central axis and the outer surface of the steel bar in a cross-section perpendicular to the longitudinal direction of the steel bar). The observation surface of the extracted sample was mirror-polished. Components of a plurality of inclusions within the mirror-polished observation surface were analyzed using a scanning electron microscope equipped with an energy dispersive X-ray spectroscope (EDX). Subsequently, oxides and Mn oxides within the observation surface were identified. Specifically, among the inclusions within the observation surface, inclusions containing oxygen in an amount of 20.0% or more in mass % were identified as "oxides". Further, among the oxides, oxides that contained Mn in an amount of 10.0% or more in mass % were identified as "Mn oxides". The ratio of the total number of Mn oxides to the total number of oxides that were identified (=number of Mn oxides/number of oxides×100) was defined as the Mn oxide number ratio NR (%).

[Test Results]

The test results are shown in Table 1 and Table 2. In Test Nos. 1 to 4, 7 to 10, 12, 13, 16, 18 to 20, 22 to 25, 28 to 33, 35 to 38, 40 to 42, 44, 46, 48, 49, 51 to 54, 57, and 59 to 65, the chemical composition was appropriate and fn1 to fn3 were also appropriate. In addition, because the production conditions were appropriate, the Mn oxide number ratio NR was not more than 10.0%. Therefore, melting cracks were not observed. In addition, the HRC hardness was within the range of 20 to 28, and it could be predicted that sufficient fatigue strength and machinability could be obtained.

On the other hand, the C content in Test No. 5 was too high. Therefore, melting cracks were observed. The C content in Test No. 6 was too low. Therefore, the HRC hardness was less than 20, and it could be predicted that sufficient fatigue strength could not be obtained.

The Si content in Test No. 11 was too high. Therefore, melting cracks occurred.

In Test No. 14, the Mn content was too high. Therefore, the HRC hardness was more than 28, and it could be predicted that sufficient machinability could not be obtained.

In Test No. 15, the Mn content was too low. Therefore, melting cracks occurred. In addition, the HRC hardness was less than 20, and it could be predicted that sufficient fatigue strength could not be obtained.

The P content in Test No. 17 and the S content in Test No. 21 were too high. Therefore, melting cracks occurred in the steel bar of each of these test numbers.

The Cr content in Test No. 26 was too high. Therefore, the HRC hardness was more than 28, and it could be predicted that sufficient machinability could not be obtained.

The Cr content in Test No. 27 was too low. Therefore, melting cracks occurred. In addition, the HRC hardness was less than 20, and it could be predicted that sufficient fatigue strength could not be obtained.

The V content in Test No. 34 was too low. Therefore, melting cracks occurred. In addition, the HRC hardness was less than 20, and it could be predicted that sufficient fatigue strength could not be obtained.

The N content in Test No. 39 was too low. Therefore, the HRC hardness was less than 20, and it could be predicted that sufficient fatigue strength could not be obtained.

The U content in Test No. 43 was too high. Therefore, melting cracks occurred.

The Cu content in Test No. 45 and the Ni content in Test No. 47 were too high. Therefore, melting cracks occurred in the steel bar of each of these test numbers.

In Test Nos. 50 and 70, fn1 was too high. Therefore, melting cracks occurred.

In Test No. 55, fn2 was too high. Therefore, the HRC hardness was more than 28, and it could be predicted that sufficient machinability could not be obtained. On the other hand, in Test No. 56, fn2 was too low. Therefore, the HRC hardness was less than 20, and it could be predicted that sufficient fatigue strength could not be obtained.

In Test Nos. 58 and 71, fn3 was too low. Therefore, melting cracks occurred.

In Test Nos. 66 and 67, in the secondary refining, Si was added after adding the Mn source to the molten steel. Therefore, the Mn oxide number ratio NR was more than 10.0%. As a result, melting cracks occurred.

In Test Nos. 68 and 69, in the secondary refining, although an Fe—Mn alloy as an Mn source was added after adding Si to the molten steel, the oxygen content of the Fe—Mn alloy was more than 1.0 at %. Therefore, the Mn oxide number ratio NR was more than 10.0%. As a result, melting cracks occurred.

An embodiment of the present invention has been described above. However, the foregoing embodiment is merely an example for implementing the present invention. Accordingly, the present invention is not limited to the above embodiment, and the above embodiment can be appropriately modified within a range that does not deviate from the gist of the present invention.

INDUSTRIAL APPLICABILITY

The non-heat treated steel for induction hardening of the present embodiment is widely applicable for use in machine structural components that are produced by a process including induction hardening. In particular, the non-heat treated steel for induction hardening of the present embodiment is suitable for use in machine structural components that are subjected to induction hardening after hot forging.

REFERENCE SIGNS LIST

1 Fillet R Portion
2 Edge Part of Crankshaft
10 Melting Cracks

The invention claimed is:

1. A non-heat treated steel for induction hardening, consisting of, in mass %,
C: 0.35 to 0.44%,
Si: 0.01 to less than 0.30%,
Mn: 0.80 to 1.50%,
P: 0.030% or less,
S: more than 0.010 to 0.095%,
Cr: more than 0.10 to 0.30%,
V: 0.050 to 0.200%,
N: 0.0040 to 0.0200%,
O: 0.0024% or less,
Cu: 0.05% or less,
Ni: 0.05% or less,
Al: 0 to 0.040%,
Ti: 0 to 0.020%,
Nb: 0 to 0.020%,
Pb: 0 to 0.30%,
Ca: 0 to 0.0100%,
Mo: 0 to 0.20%,
fn1 defined by Formula (1) being 50.0 or less,
fn2 defined by Formula (2) being 0.70 to 1.00,
fn3 defined by Formula (3) being 1.30 or more, and
the balance being Fe and impurities,
wherein oxides are defined as inclusions containing oxygen in an amount of 20.0 mass % or more, and, among the oxides, Mn oxides are defined as inclusions containing oxygen in an amount of 20.0 mass % or more and Mn in an amount of 10.0 mass % or more, and a ratio of a total number of the Mn oxides with respect to a total number of the oxides is 10.0% or less;

$$fn1 = 80C^2 + 55C + 13Si + 4.8Mn + 30P + 30S + 1.5Cr \quad (1)$$

$$fn2 = C + (Si/10) + (Mn/5) - (5S/7) + (5Cr/22) + 1.65V \quad (2)$$

$$fn3 = -2C - Si + 2.33Mn + 0.26Cr + V - 1.5Cu - 1.5Ni \quad (3)$$

where a content in mass % of a corresponding element is substituted for each symbol of an element in Formula (1) to Formula (3).

2. The non-heat treated steel for induction hardening according to claim 1, having:
Al: 0.005 to 0.040%.

3. The non-heat treated steel for induction hardening according to claim 1, having:
Ti: 0.005 to 0.020%, and/or
Nb: 0.005 to 0.020%.

4. The non-heat treated steel for induction hardening according to claim 1, having:
Pb: 0.10 to 0.30%, and/or
Ca: 0.0010 to 0.0100%.

5. The non-heat treated steel for induction hardening according to claim 1, having:
Mo: 0.05 to 0.20%.

6. The non-heat treated steel for induction hardening according to claim 2, having:
Ti: 0.005 to 0.020%, and/or
Nb: 0.005 to 0.020%.

7. The non-heat treated steel for induction hardening according to claim 2, having:
Pb: 0.10 to 0.30%, and/or
Ca: 0.0010 to 0.0100%.

8. The non-heat treated steel for induction hardening according to claim 2, having:
Mo: 0.05 to 0.20%.

9. The non-heat treated steel for induction hardening according to claim 3, having:
Pb: 0.10 to 0.30%, and/or
Ca: 0.0010 to 0.0100%.

10. The non-heat treated steel for induction hardening according to claim 3, having:
Mo: 0.05 to 0.20%.

11. The non-heat treated steel for induction hardening according to claim 4, having:
Mo: 0.05 to 0.20%.

12. The non-heat treated steel for induction hardening according to claim 6, having:
Pb: 0.10 to 0.30%, and/or
Ca: 0.0010 to 0.0100%.

13. The non-heat treated steel for induction hardening according to claim 6, having:
Mo: 0.05 to 0.20%.

14. The non-heat treated steel for induction hardening according to claim 7, having:
Mo: 0.05 to 0.20%.

15. The non-heat treated steel for induction hardening according to claim 9, having:
Mo: 0.05 to 0.20%.

16. The non-heat treated steel for induction hardening according to claim 12, containing having:
Mo: 0.05 to 0.20%.

* * * * *